United States Patent Office 2,758,743
Patented Aug. 14, 1956

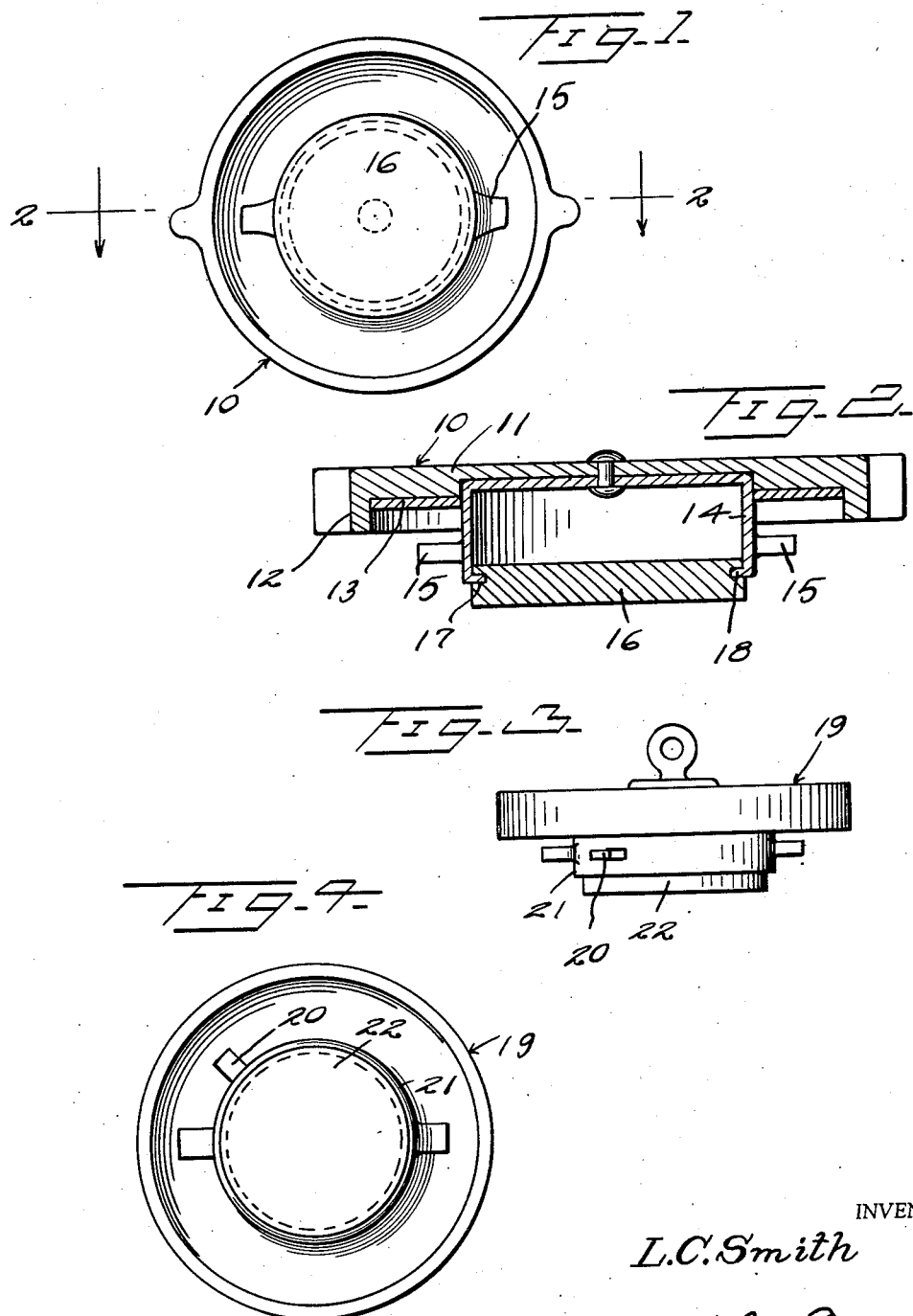

2,758,743

GAS TANK CAP WITH MAGNETIC STORING MEANS

Lionel C. Smith, Jumping Branch, W. Va.

Application April 8, 1954, Serial No. 421,830

1 Claim. (Cl. 220—24)

This invention relates to the cap for gas tanks of motor vehicles.

In motor vehicles the intake neck has a cap removably mounted thereon, and in many instances the cap includes a locking means operated by a key. When the tank is being filled with fuel, the attendant removes the cap and places it either on some part of the vehicle, on the pump, or some available support. Frequently the cap falls on the ground and rolls under the vehicle. It is, therefore, an object of this invention to provide in a gas tank cap, means whereby the cap will be temporarily attached to the vehicle so that if the attendant fails to mount the cap on the filler neck the cap will stay on the vehicle until it is manually removed.

Another object of this invention is to provide in a gas tank cap, a permanent magnet which will effect adherence of the cap to the vehicle fender, bumper, or other metallic element on the vehicle.

With the above and other objects in view, my invention consists in the arrangement, combination and details of construction disclosed in the drawing and specification, and then more particularly pointed out in the appended claim.

In the drawing:

Figure 1 is a bottom plan view of a gas tank cap constructed according to an embodiment of this invention.

Figure 2 is a sectional view taken on the line 2—2 of Figure 1.

Figure 3 is a detail side elevation of a lock type gas tank cap constructed according to an embodiment of this invention.

Figure 4 is a bottom plan view of the cap shown in Figure 3.

Referring to the drawing, the numeral 10 designates generally a cap adapted for mounting on a gas tank filler neck. The cap 10 is formed of a top wall 11 having a depending marginal flange 12 within which a sealing gasket 13 is positioned.

The cap 10 has mounted therein a cylindrical wall 14 which is engageable interiorly of the filler neck, and the wall 14 has projecting outwardly therefrom a pair of diametrically opposed locking lugs 15.

In order to provide a means whereby the cap 10 will be detachably secured to any metal part of the vehicle in order that the cap will not fall on the ground or become lost, I have provided a plate 16 constructed in the form of a magnetized member which projects from the inner end of the cylindrical wall 14. The plate or magnet 16 is provided with a peripheral groove 17 within which an inturned flange 18 carried by the cylindrical wall 14 is adapted to engage.

The cap with the magnet 16 attached thereto may be placed on a fender, bumper, or other iron or steel part of the vehicle, and the magnet 16 will detachably hold the cap on the vehicle.

Referring now to Figures 3 and 4, there is disclosed a lock type cap generally indicated at 19. The cap 19 is similar to cap 10 with the exception that a key operated locking bolt 20 projects through the skirt or cylindrical wall 21. A magnified plate 22 is carried by the wall 21 and projects from the inner end of the cap so that the plate or magnet 22 may be magnetically attached to a selected metal portion of the vehicle.

With a cap as hereinbefore described, when the attendant removes the cap 10 from the filler neck of the gas tank the cap may be applied to the fender, trunk door, bumper, or other part of the vehicle and the magnet 16 will snugly hold the cap to the applied portion of the vehicle. In this manner, if the attendant should forget to return the cap to the filler neck the cap will not become lost in the subsequent movement of the vehicle.

What is claimed is:

A gas tank closure comprising a cap member, a substantially cylindrical member fixed to the inner side of said cap member, a flange integral with the lower edge of said cylindrical member and extending inwardly from said cylindrical member, a disc-shaped magnetized plate projecting partly into the inner end of said cylindrical member, said plate having a circumferential groove encompassing said flange whereby said plate and said cylindrical member are secured together.

References Cited in the file of this patent

UNITED STATES PATENTS

| 530,581 | Davis | Dec. 11, 1894 |
| 2,467,088 | Konchan | Apr. 12, 1949 |

FOREIGN PATENTS

| 624,400 | Great Britain | June 7, 1947 |